US006082692A

United States Patent [19]
Price

[11] Patent Number: 6,082,692
[45] Date of Patent: Jul. 4, 2000

[54] METHOD FOR SUPPORTING A FIRST COMPUTER COMPONENT RELATIVE TO A SECOND COMPUTER COMPONENT

[75] Inventor: Travis Price, Boise, Id.

[73] Assignee: Micron Electronics, Inc., Nampa, Id.

[21] Appl. No.: 08/969,190

[22] Filed: Nov. 13, 1997

[51] Int. Cl.[7] ................................................. E04G 3/00
[52] U.S. Cl. ........................ 248/278.1; 248/918
[58] Field of Search ................................ 248/918, 278.1, 248/917, 284.1, 441.1, 279.1, 118.3, 288.51

[56] References Cited

U.S. PATENT DOCUMENTS

| | | |
|---|---|---|
| D. 357,910 | 5/1995 | Newhouse ............................... D14/114 |
| 3,638,973 | 2/1972 | Poletti . |
| 4,546,708 | 10/1985 | Wilburth . |
| 4,619,427 | 10/1986 | Leymann . |
| 4,844,388 | 7/1989 | Kuba et al. . |
| 4,863,124 | 9/1989 | Ball et al. . |
| 4,923,259 | 5/1990 | Bartok .................................... 312/223.2 |
| 5,031,867 | 7/1991 | Cotterill ................................. 248/281.1 |
| 5,037,054 | 8/1991 | McConnell ............................ 248/284.1 |
| 5,074,511 | 12/1991 | Wilson . |
| 5,211,367 | 5/1993 | Musculus . |
| 5,219,136 | 6/1993 | Hassel et al. . |
| 5,375,800 | 12/1994 | Wilcox et al. . |
| 5,443,237 | 8/1995 | Stadtmauer ........................... 248/441.1 |
| 5,487,525 | 1/1996 | Drabczyk et al. . |
| 5,564,667 | 10/1996 | Copeland et al. .................... 248/278.1 |
| 5,588,727 | 12/1996 | D'Agaro et al. ......................... 312/283 |
| 5,624,198 | 4/1997 | Fuchs . |
| 5,730,408 | 3/1998 | McAllister et al. ............... 248/288.51 |
| 5,772,174 | 6/1998 | Hirsch et al. . |
| 5,791,263 | 8/1998 | Watt et al. . |
| 5,799,917 | 9/1998 | Li . |
| 5,845,885 | 12/1998 | Carnevali . |
| 5,850,997 | 12/1998 | Rosen . |

*Primary Examiner*—Ramon O. Ramirez
*Assistant Examiner*—David Heisey
*Attorney, Agent, or Firm*—Perkins Coie LLP

[57] ABSTRACT

A method for supporting a keyboard relative to a monitor. The method may be practiced with a base member configured to engage the second computer component and a support surface, and a support assembly having a first portion configured to support the monitor in a selected position and a second portion coupled to the base member. The first portion of the support assembly may be movable toward and away from the base member along two orthogonal axes, or may be pivotable about two orthogonal axes relative to the base member. A weight of at least one of the monitor and the base member may be sufficient to maintain contact between the base member and the support surface when the keyboard is supported by the support assembly in the selected position and the base member supports the monitor.

7 Claims, 5 Drawing Sheets

6,082,692

METHOD FOR SUPPORTING A FIRST COMPUTER COMPONENT RELATIVE TO A SECOND COMPUTER COMPONENT

TECHNICAL FIELD

The present invention is directed toward a method for supporting a first computer component relative to a second computer component.

BACKGROUND OF THE INVENTION

Computers, such as personal computers, typically comprise a central processing unit (CPU), monitor, and various peripheral devices including a keyboard. In a typical installation, the monitor is placed on a desk or other elevated work surface and the keyboard and other peripheral devices are arranged around the monitor within hand's reach of the user. Often, the keyboard and other devices are placed on the user's desk or work surface and accordingly take up space thereon even when not in use. This arrangement limits the user's useful work area.

One approach to solving the above problem has been to position the keyboard on a tray which is stowed beneath the work surface when the keyboard is not in use. Such devices are disclosed by U.S. Pat. No. 5,443,237 to Stadtmauer, U.S. Pat. No. 5,031,867 to Cotterill, U.S. Pat. No. 5,211,367 to Musculus, U.S. Pat. No. 5,487,525 to Drabczyk et al., and U.S. Pat. No. 5,564,667 to Copeland et al. One drawback with the above-described approach is that the tray and keyboard may interfere with the user's leg room when they are stowed beneath the work surface. Another problem is that the tray may extend away from the work surface when the keyboard is in use, forcing the user to move away from the work surface and making other peripheral devices difficult to reach. Yet another problem is that the tray may have only a limited amount of motion beyond the motion required to move the tray horizontally toward and away from the working surface. Accordingly, it may be difficult for the user to move the tray to a comfortable position. This is particularly so where the user may wish to access the tray and keyboard from a sitting position on some occasions and from a standing position on other occasions. Still a further problem is that the cables necessary to couple the keyboard to the CPU may interfere with the motion of the tray.

One approach to solving the above problems has been to place the keyboard on a tray which slides inwardly and outwardly from a housing which is mounted beneath the monitor but above the work surface, as disclosed by U.S. Pat. No. 4,923,259 to Bartok. The device disclosed by Bartok may accordingly reduce the degree to which the tray interferes with the user's leg room. However, the Bartok device may still suffer from the additional drawbacks discussed above with reference to keyboard trays mounted beneath the working surface. Furthermore, the housing disclosed by Bartok is sized to accommodate both the keyboard and tray therein, and may accordingly raise the height of the monitor to an undesirable level.

SUMMARY OF THE INVENTION

The present invention is a method for supporting a first computer component relative to a second computer component. In one embodiment of the invention, the method comprises engaging a first portion of a support assembly with the first computer component and engaging a second portion of the support assembly with the second computer component so as to cantilever the first portion of the support assembly outwardly away from the second portion. The method further comprises translating the first portion of the support assembly in two orthogonal directions relative to the second computer component to place the first computer component in the selected position.

In another embodiment, the method comprises engaging the first portion of the support assembly with a first computer component, engaging the second portion of the support assembly with the second computer component so as to cantilever the first portion outwardly away from the second portion, and pivoting the first portion of the support assembly about at least two orthogonal axes relative to the second computer component. In still another embodiment, the method comprises connecting the second portion of the support assembly to the second component and engaging the first portion of the support assembly with the first computer component so as to cantilever the first portion of the support assembly outwardly away from the seco nd portion.

DETAILED DESCRIPTION OF THE INVENTION

The present invention is directed toward a method for positioning a first computer component relative to a second computer component. In accordance with the method, a device is positioned between the second computer component and a working surface so that the first computer component may be cantilevered away from the working surface. The first computer component may accordingly be moved to a variety of positions relative to the second computer component and may be stowed in a variety of positions when not in use. FIGS. 1–11 illustrate various embodiments of a device operating in accordance with the method, and like reference numbers refer to like parts throughout the figures.

Figure 1:
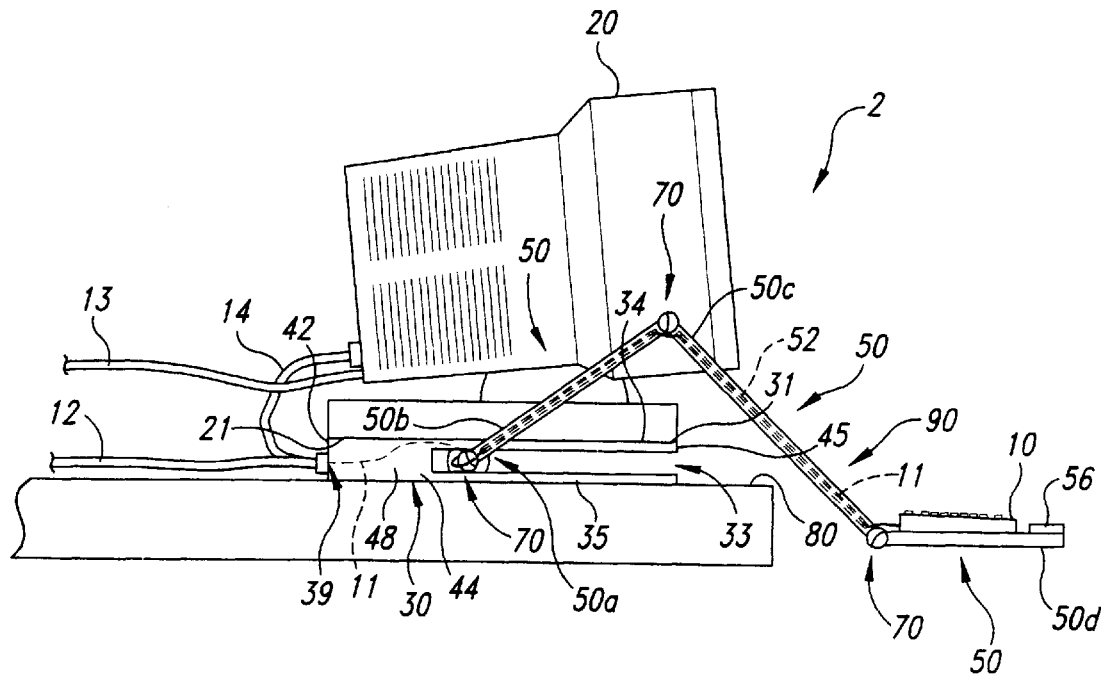
FIG. 1 is a side view of a device that operates in accordance with an embodiment of the invention shown supporting a first computer component in a first position and extending beneath a second computer component.

FIG. 1 is a side view of a support device 2 that operates in accordance with an embodiment of the invention to support a first computer component, such as a keyboard 10, relative to a second computer component, such as a computer monitor 20. The support device 2 comprises a base member 30 positioned on a support surface 80, such as a desktop. The monitor 20 is placed on the base member 30 so that the base member 30 supports the monitor 20. The support device 2 further comprises a support assembly 90 connected to the base member 30 and configured to engage the keyboard 10. The support assembly 90 may be movable relative to the base member 30, as shown in FIG. 1, or may be fixed relative to the base member as will be discussed in greater detail below with reference to FIG. 11.

The base member 30 may be sized and shaped to fit beneath the monitor 20 such that an upper surface 31 of the base member supports a lower surface 21 of the monitor. Accordingly, the base member 30 may have a front surface 45, rear surface 42 and side surfaces 44 which are generally aligned with the edges of the lower surface 21 of the monitor 20. Although the first computer component is shown in FIG. 1 as being a keyboard 10, it will be understood that the first computer component may be other computer components in other embodiments. Similarly, although the second computer component is shown in FIG. 1 as being a monitor 20, it will be understood that the second computer component may be other computer components in other embodiments. The base member 30 may be large enough to support the monitor 20 in a stable position on the support surface 80 without being so large as to unnecessarily take up space on the support surface.

In one embodiment, the base member 30 has a gap 33 which accommodates the support assembly 90. The gap 33 may be defined by an upper plate member 34 spaced apart from a lower plate member 35 and connected to the lower plate member with a rear member 48. The gap 33 is preferably sized to allow motion of the support assembly 90 relative to the base member 30, as will be discussed in greater detail below.

Figure 2:
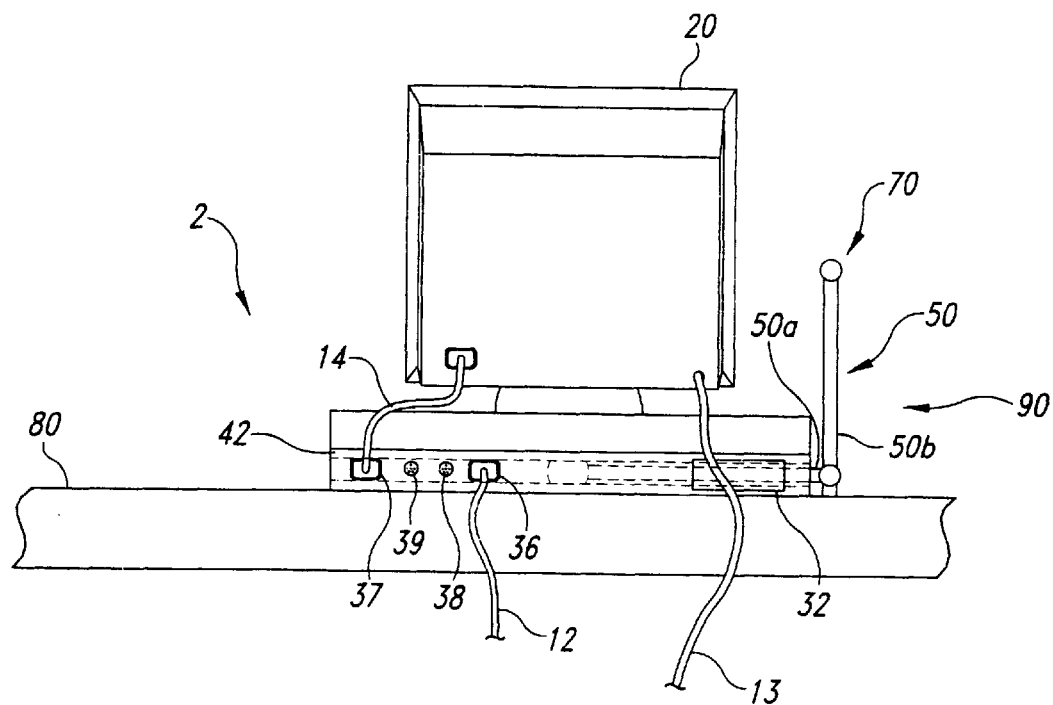
FIG. 2 is a rear view of the device shown in FIG. 1.

FIG. 2 is a rear view of the support device 2. As shown in FIG. 2, the rear surface 42 of the base member 30 may include a power cable connector 36 sized to receive a power cable 12 which may be used to supply power to the base member. The base member 30 may further include a power cable outlet 37 which is coupled within the base member to the power cable connector 36 and may be connected externally with a short power cable 14 to the monitor 20, as shown in FIG. 2, or to the keyboard 10 or other devices. A surge protector 32 may be coupled to the power cable outlet 37 to protect devices connected thereto from power fluctuations. The base member 30 may also include a first component terminal 39 which may be coupled externally to other devices and may be coupled internally to the keyboard 10 as will be discussed in greater detail below.

The base member 30 may further include a second component terminal 38 which may be coupled externally to devices which transmit signals to and from the monitor 20 and may be coupled internally to the monitor 20. The second component terminal 38 may be coupled to the monitor 20 in addition to or in lieu of a direct connection to the monitor, which may be provided by a cable 13. The base member 30 may include other terminals or connectors in other embodiments.

As shown in FIGS. 1 and 2, the base member 30 may be removably positioned between the monitor 20 and the support surface 80. In another embodiment, the base member 30 may be formed integrally with the monitor 20 or other component. An advantage of a removable base member 30 is that it may be easily moved from one computer to another. Conversely, an advantage of an integral base member 30 is that it may be less likely to become separated from the monitor 20, and accordingly may be more likely to support the keyboard 10 in a selected position.

The base member 30 is coupled to the support assembly 90, which supports the keyboard 10 in a selected position relative to the monitor 20. In one embodiment, the support assembly 90 comprises a plurality of support members 50 connected to each other at couplings 70. In one embodiment, the couplings 70 may comprise ball-and-socket type joints, as shown in FIGS. 1 and 2 and as discussed in greater detail below with reference to FIG. 4. In another embodiment, the couplings 70 may comprise disk type couplings, as will be discussed in greater detail below with reference to FIG. 5. In either case, the support assembly 90 may include a first support member 50a connected to the base member 30, a second support member 50b connected at one end to the first support member and at another end to a third support member 50c, which is in turn connected to a fourth support member 50d. The fourth support member 50d is accordingly configured to engage and support the keyboard 10. The support assembly 90 may comprise more or fewer support members 50 in other embodiments.

Figure 3A:
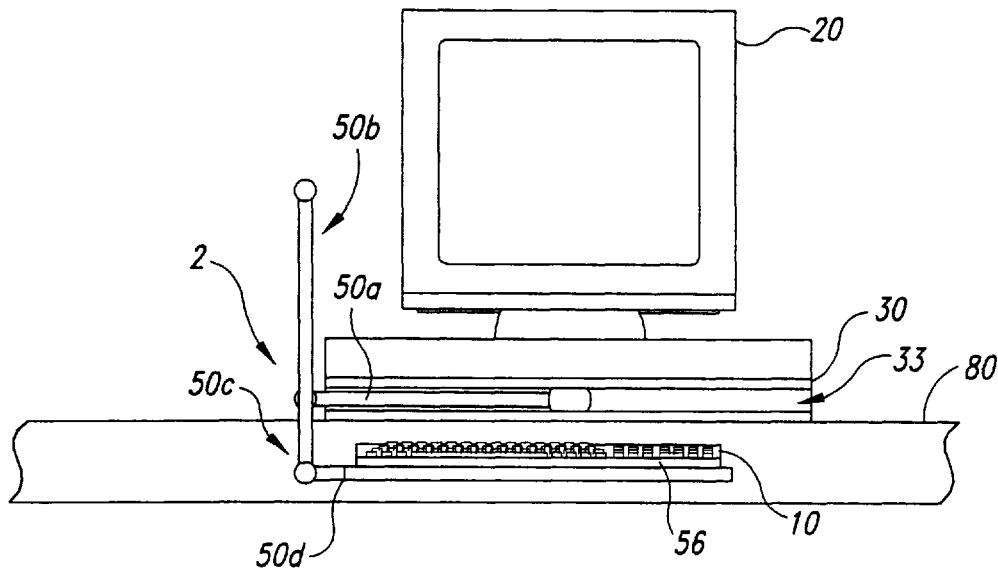
FIG. 3A is a front view of the device shown in FIG. 1.

FIG. 3A is a front view of the support device 2 shown in FIG. 1. Referring to FIGS. 1 and 3A, the first support member 50a may be pivotally connected to the base 30 so as to extend outwardly beyond the gap 33 of the base. The first support member 50a may accordingly be pivoted through an arc extending from the left side of the base member 30, as shown in FIG. 3A, to the right side of the base member. The second support member 50b may be pivotally connected to the first support member 50a, and the third support member 50c may be pivotally connected to the second support member. The second and third support members 50b and 50c accordingly allow the fourth support member 50d and the keyboard 10 positioned thereon to be moved upwardly, downwardly, and laterally along at least two orthogonal axes relative to the base member 30.

Figure 3B:
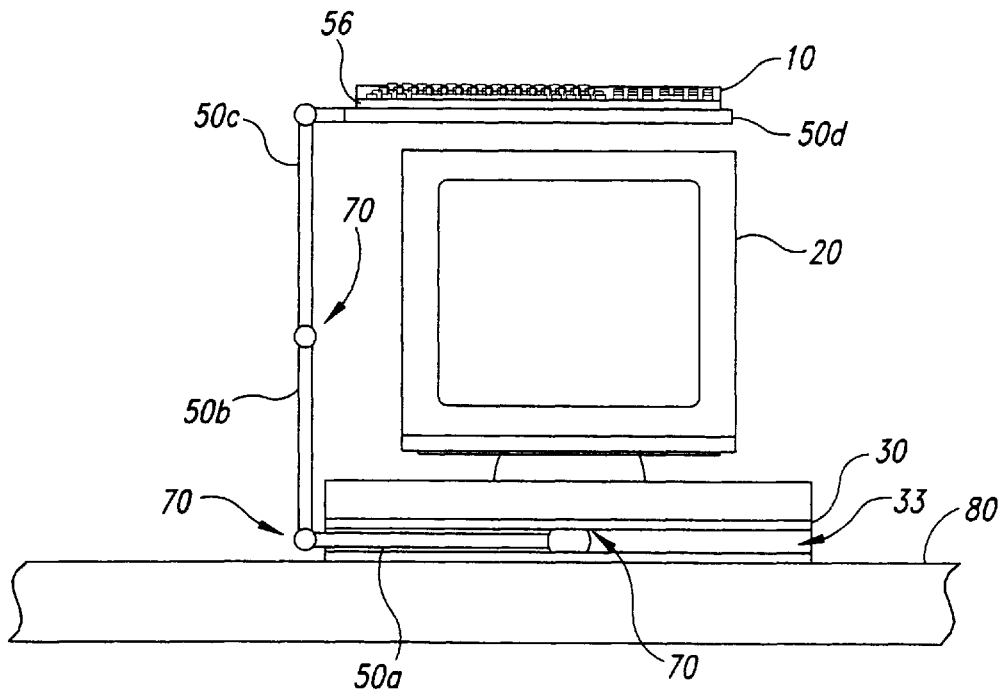
FIG. 3B is a front view of the device shown in FIG. 1, supporting the first computer component in a second position.

The support members 50 may be arranged to place the keyboard 10 in a position which is readily accessible to a seated user, as shown in FIG. 1, or may be arranged to position the keyboard above the monitor 20, as shown in FIG. 3B. When the keyboard 10 is positioned above the monitor 20, the support surface 80 forward of the monitor 20 is unobstructed, allowing the user to access this area for other purposes. Alternatively, the user may wish to access the keyboard 10 from a standing position which may be easier when the keyboard is positioned above the monitor 20, as shown in FIG. 3B. In a similar manner, the support members 50 may be moved to a myriad of other positions not shown in the Figures to place the keyboard 10 in a selected location relative to the monitor 20. The selected location may be above, below, in front of or to either side of the monitor 20.

The fourth support member 50d may be pivotally connected to the third support member 50c to allow the user to adjust the tilt of the keyboard 10 relative to the monitor 20. Where the first computer component comprises a keyboard 10, the fourth support member 50d may comprise a tray sized and shaped to engage the keyboard 10. The fourth support member 50d may further comprise a wrist support 56 to support the wrists of the user while the user types at the keyboard 10. The fourth support member 50d may have other configurations in other embodiments, as will be discussed below with reference to FIGS. 9 and 10.

In one embodiment, the support members 50 each have an aperture 52 extending therethrough, sized to accommodate a connecting cable 11 which extends between the keyboard 10 and the base member 30, as shown in FIG. 1. In one embodiment, the connecting cable 11 extends external to the support members 50 at the couplings 70. In another embodiment, the couplings 70 may themselves be provided with apertures which are sized to accommodate the connecting cable 11 therein. The connecting cable 11 may be coupled within the base member 30 to the first component terminal 39. As discussed above, the first component terminal 39 may then be coupled to other devices, such as the computer chassis (not shown). Alternatively, the connecting cable 11 may be routed through the base member 30 and coupled directly to the other devices.

In one embodiment, the weight of the monitor 20 is sufficient to keep the base member 30 firmly on the support surface 80, regardless of the position of the support assembly 90 and the keyboard 10. In another embodiment, the weight of the base member 30 itself, or the weight of the base member and monitor 20 combined, is sufficient to clamp the base member 30 to the support surface 80. In either embodiment, the support assembly 90 may be placed in any position within its range of motion without causing the base member 30 to tip away from the support surface 80.

An advantage of the support device 2 shown in FIGS. 1–3B is that it allows the keyboard 10 to be stowed above the support surface 80. Accordingly, it is possible for the keyboard 10 to avoid interfering with the user's leg room when in the stowed position. A further advantage of the support device 2 is that it allows the keyboard 10 to be stowed in and/or accessed from a wide variety of locations. The support device 2 accordingly allows users having varying physical characteristics to easily adjust the location of the keyboard 10 to suit their preferences.

Yet another advantage of the support device 2 is that the base member 30 need only extend far enough above the support surface 80 to accommodate the coupling 70 between the base member and the first support member 50a. The base member 30 need not be sized to accommodate the entire support assembly 90 and the keyboard 10 when the keyboard is stowed. Accordingly, the height of the base member 30 may be relatively small so as to elevate the monitor 20 above the support surface 80 by a relatively small amount. This may be advantageous because it may be easier for shorter users to properly view the monitor 20. Furthermore, by placing the monitor 20 closer to the support surface 80, the amount by which the monitor 20 projects above the support surface 80 is reduced, and accordingly the likelihood that the monitor 20 may be inadvertently struck or tipped over is also reduced.

Still a further advantage of an embodiment of the support device 2 is that the cable 11 connecting the keyboard 10 to other devices may be positioned within the support assembly 90. The degree to which the connecting cable 11 interferes with motion of the support assembly and with peripheral devices or other objects on the support surface 80 may be accordingly reduced.

Figure 4:
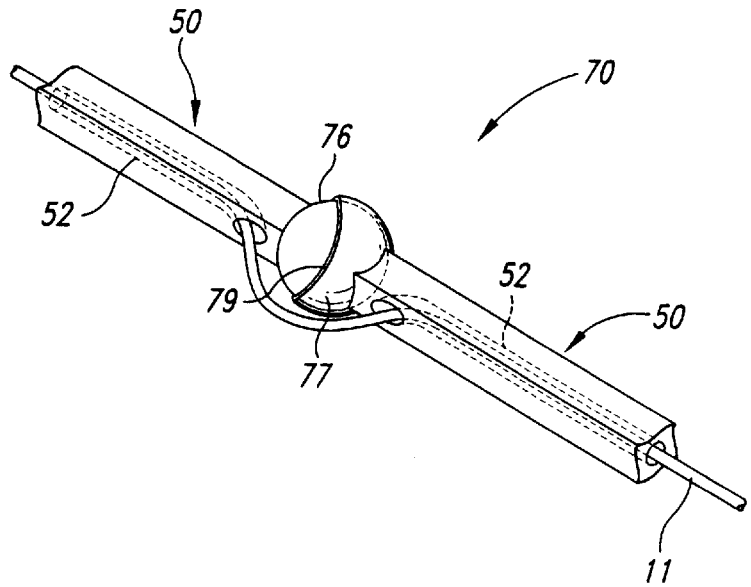
FIG. 4 is a detailed, exploded, isometric view of one embodiment of a coupling which connects support members of the device shown in FIG. 1.

FIG. 4 is a detailed isometric view of the coupling 70 shown in FIGS. 1–3B which allows the support members 50 to pivot relative to each other in a plurality of planes. As shown in FIG. 4, one of the two support members 50 coupled by the coupling 70 has a spherically-shaped ball portion 76 positioned toward one end thereof, and the other support member has a corresponding spherically-shaped socket portion 77 positioned toward one end thereof. The ball portion 76 is preferably sized to fit snugly within the socket portion 77, but not so snugly as to prevent relative motion between the support members 50 coupled by the coupling 70. In one embodiment, frictional forces between the ball portion 76 and socket portion 77 are sufficient to hold the support members 50 in a selected position and are also low enough to permit the user to reposition the support members when desired without exerting an excessive amount of force. In one embodiment, an edge 79 of the socket portion 77 is scarfed back to allow a large degree of relative motion between the support members 50 coupled by the coupling 70. The edge 79 is not scarfed so far back as to allow the ball portion 76 to become disengaged from the socket portion 77.

Figure 5:
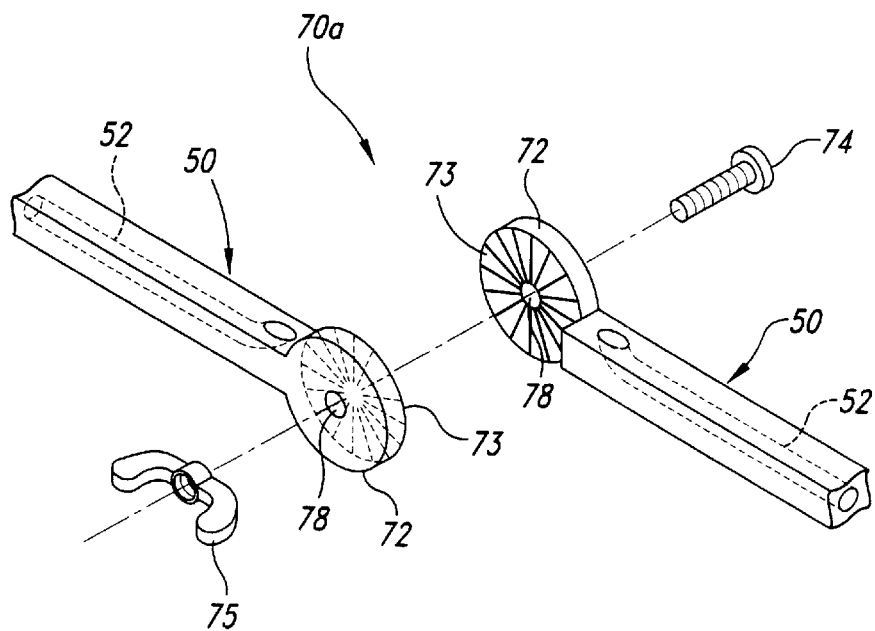
FIG. 5 is a detailed, exploded, isometric view of another embodiment of the coupling shown in FIG. 4.

FIG. 5 is a detailed, exploded, isometric view of a coupling 70a in accordance with another embodiment of the invention. The coupling 70a comprises two mating disk portions 72, each being positioned toward the end of a support member 50. Each disk portion 72 has a plurality of radially extending teeth 73 shaped to engage similarly shaped teeth of the mating disk portion. Each disk portion 72 further has an aperture 78 sized to accommodate a bolt 74 which extends therethrough. Two support members 50 are accordingly joined by positioning the disk portions 72 thereof adjacent each other such that the teeth 73 of one disk portion are positioned to engage the corresponding teeth 73 of the other disk portion. The bolt 74 is passed through the apertures 78 and a wing nut 75 is threaded on the end of the bolt to tightly clamp the disk portions 72 together, locking the support members 50 relative to each other. When the user wishes to reposition one support member 50 relative to the other, he may loosen the wing nut 75 to allow the teeth 73 to disengage, rotate the support member to the desired position, and re-tighten the wing nut 75 to once again lock the support members. The coupling 70a accordingly allows the pivot members 50 to rotate relative to each other in a single plane.

In other embodiments, the coupling 70a may comprise other means for selectively repositioning and locking the position of one support member 50 relative to another support member. In one such embodiment, the bolt and wing nut arrangement shown in FIG. 5 may be replaced by a spring mechanism (not shown) which biases the two disk portions 72 toward each other. The user may manually separate the disk portions 72 to reposition the support members 50 and allow the biasing device to lock the support members in place once the desired position is achieved.

The couplings 70, 70a, or variations thereof may be positioned to couple any of the support members 50 together, or to couple the first support member 50a to the base member 30. In one embodiment, a ball-and-socket type coupling similar to that shown in FIG. 4 may couple the support members 50 to each other, and couple the first support member 50a to the base member 30, as shown in FIG. 1. In other embodiments, some or all of the ball-and-socket type couplings 70 may be replaced with disk type couplings 70a. An advantage of the ball-and-socket type coupling 70 when compared to the disk type coupling 70a is that the ball-and-socket coupling permits the support members coupled thereby to be pivoted relative to each other about three orthogonal axes. Conversely, an advantage of the disk type coupling 70a may be that it is simpler to manufacture.

Figure 6:
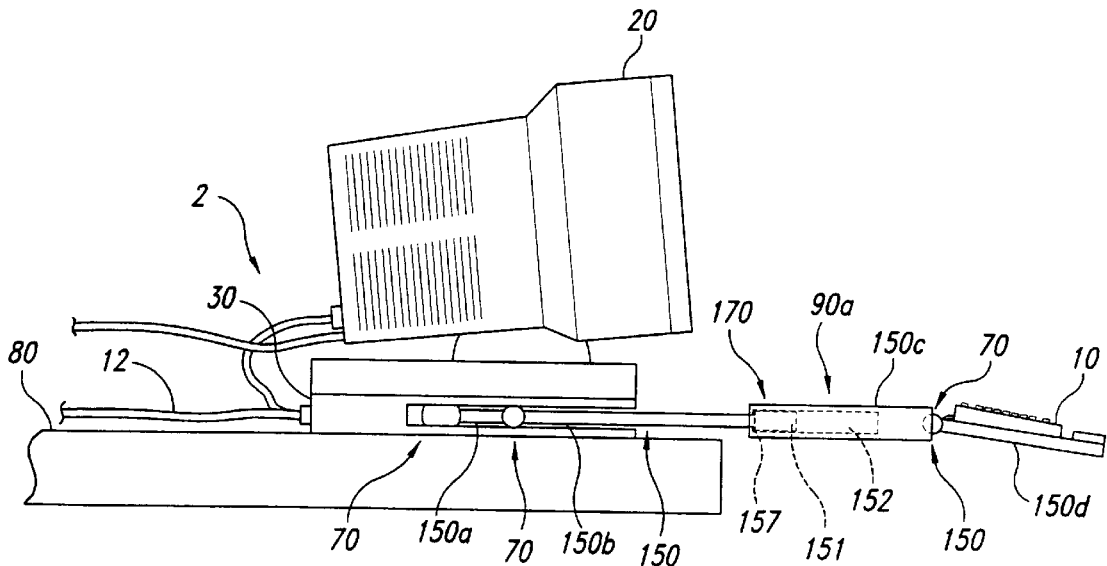
FIG. 6 is a side view of a device that operates in accordance with another embodiment of the invention having a telescoping support assembly.

FIG. 6 is a side view of a support device 2 that operates in accordance with another embodiment of the invention having a telescoping support assembly 90a. The support assembly 90a comprises a plurality of support members 150, including a first support member 150a, generally similar to the support member 50a shown in FIG. 1, coupled at pivotable couplings 70 to both the base member 30 and the second support member 150b. The second and third support members 150b and 150c are coupled with a telescoping coupling 170. Accordingly, the third support member 150c has an aperture 152 therein sized and shaped to slideably accommodate the second support member 150b. The second support member 150b includes a stop 151 positioned at an end thereof and positioned to engage a lip 157 of the third support member 150c to prevent the second support member from sliding completely out of the third support member.

In one embodiment, the first support member 150a and fourth support member 150d are coupled using pivotable couplings 70 or 70a while the second and third support members 150b and 150c are coupled with telescoping couplings 170. In other embodiments, other combinations of pivotable and telescoping couplings may be used to provide the user with the desired level of positioning flexibility. An advantage of the telescoping coupling 170 when compared with the pivotable coupling 70 is that the support members 50 coupled by the telescoping coupling may be less obtrusive because the support members nest within each other. Conversely, an advantage of the pivotable couplings 70 and in particular the ball-and-socket type coupling, may be that it is possible for the pivotable couplings to provide more degrees of freedom of movement between the support members 50 connected thereby.

Figure 7:
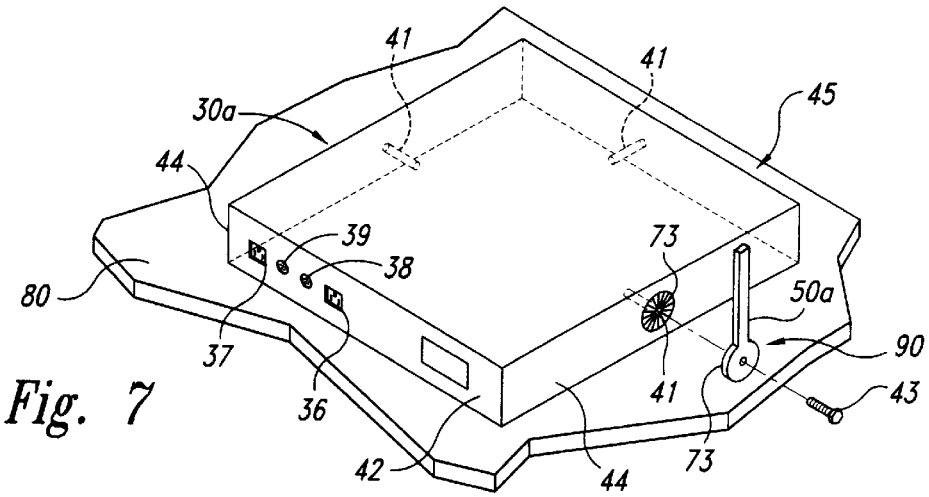
FIG. 7 is a top isometric view of a base member that operates in accordance with an embodiment of the invention having a plurality of connection sites for supporting a support assembly.

FIG. 7 is a top isometric view of a base member 30a that operates in accordance with an embodiment of the invention having a plurality of coupling apertures 41 positioned therein. The coupling apertures 41 may comprise elongated threaded holes sized to receive a connecting bolt 43. The connecting bolt 43 pivotably secures the first support member 50a to the base member 30a. In one embodiment, frictional forces between the first support member 50a and the base member 30a are sufficient to support the first support member 50a in a desired position while at the same time are not so strong as to prevent a user from deliberately repositioning the first support member. In another embodiment, the first support member 50a and the region surrounding the coupling aperture 41 may include radial teeth 73 similar to those shown in FIG. 5 to ensure positive engagement between the first support member 50a and the base member 30a. In one embodiment, the base member 30 includes coupling sites 41 at the side surfaces 44 and front surface 45 thereof. The rear surface 42 of the base member 30a may not include a coupling site 41 in one embodiment because movement of the first support member 50a may interfere with cables connected to the rear surface 42. In another embodiment, the rear surface 42 may include a coupling site 41 which is positioned to reduce any interference between the first support member 50a and the cables or connectors proximate to the rear surface.

An advantage of the base member 30a shown in FIG. 7 is that it allows the support assembly 90 to be positioned at any one of several coupling sites 41 thereof. The coupling sites 41 may be simpler and less expensive to manufacture than the single coupling between the support assembly 90 and the base member 30 shown in FIG. 1. A further advantage is that the base member 30a may allow a plurality of support assemblies 90 to be attached thereto. Accordingly, a keyboard may be supported by one support assembly 90 and a mouse or other peripheral device may be supported by another support assembly, allowing the user greater flexibility in positioning the peripheral devices and making use of the support surface 80. Conversely, an advantage of the coupling 70 between the support assembly 90 and the base member 30 shown in FIG. 1 is that it allows the support assembly to be moved to a wide variety of positions without having to detach the support assembly from the base member and then reattach the support assembly at a different location of the base member.

Figure 8:
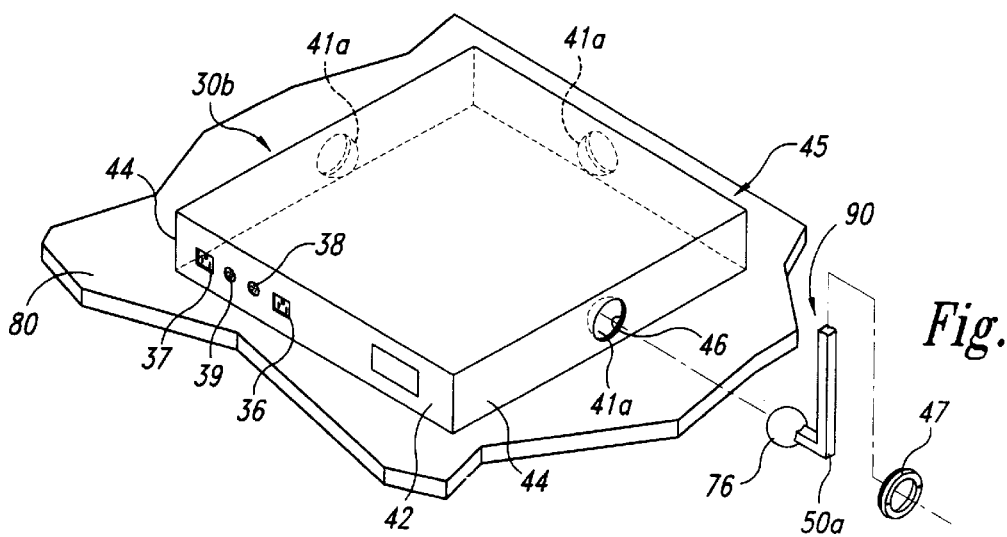
FIG. 8 is a top isometric view of another embodiment of the base member shown in FIG. 7.
Figure 9:
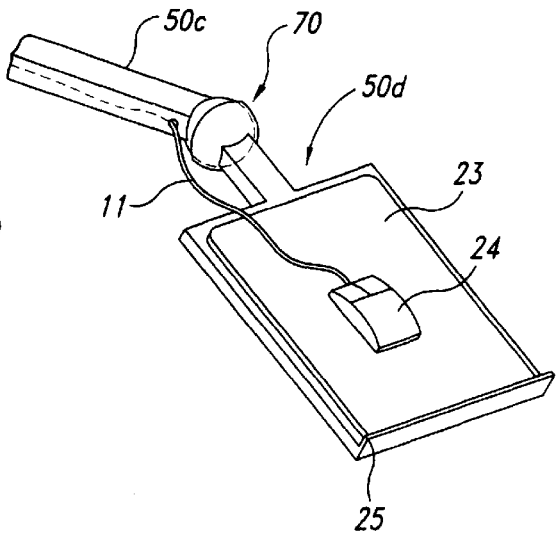
FIG. 9 is a top isometric view of a support member that operates in accordance with an embodiment of the invention.

FIG. 8 is a top isometric view of a base member 30b having a plurality of coupling sites or sockets 41a that operates in accordance with another embodiment of the invention. Each socket 41a has a spherical shape and is sized to accommodate a similarly shaped ball portion 76 of the first support member 50a. A portion of an inner wall 46 of each socket is threaded to engage a coupling ring 47 which may be threadably engaged therewith to firmly bias the ball portion 76 into engagement with the socket 41a. An advantage of the sockets 41a shown in FIG. 8, when compared to the elongated coupling apertures 41 shown in FIG. 7, is that the sockets may permit a greater range of motion of the first support member 50a relative to the base member 30b. Conversely, an advantage of the elongated coupling apertures 41 is that they may be less expensive to manufacture.

Figure 10:
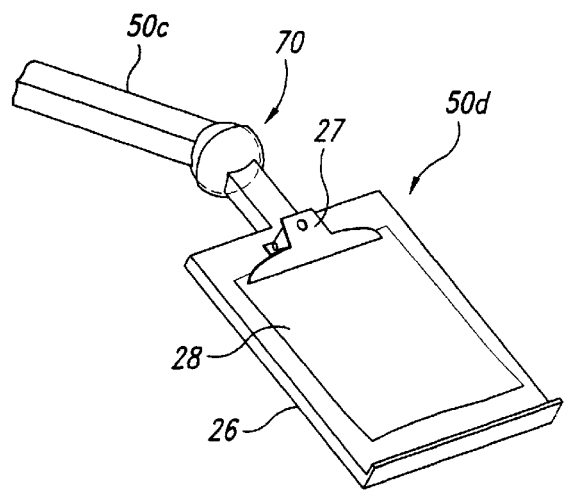
FIG. 10 is a top isometric view of a support member that operates in accordance with another embodiment of the invention.

As discussed above with reference to FIG. 1, the fourth support member 50d may be configured to support a computer keyboard 10 in one embodiment. In another embodiment shown in FIG. 9, the fourth support member 50d may be configured to support other peripheral devices including a mouse pad 23 and/or a computer mouse 24. The fourth support member 50d may further include a lip 25 positioned to prevent either the mouse pad 23 or the mouse 24 from sliding off the fourth support member. In yet another embodiment shown in FIG. 10, the fourth support member 50d may be configured to support non-computer devices, such as papers 28 or other materials which the user may wish to position near the monitor 20. As shown in FIG. 10, the fourth support member 50d may include a paper tray 26 and spring clip 27 to support the paper 28 in position.

Figure 11:
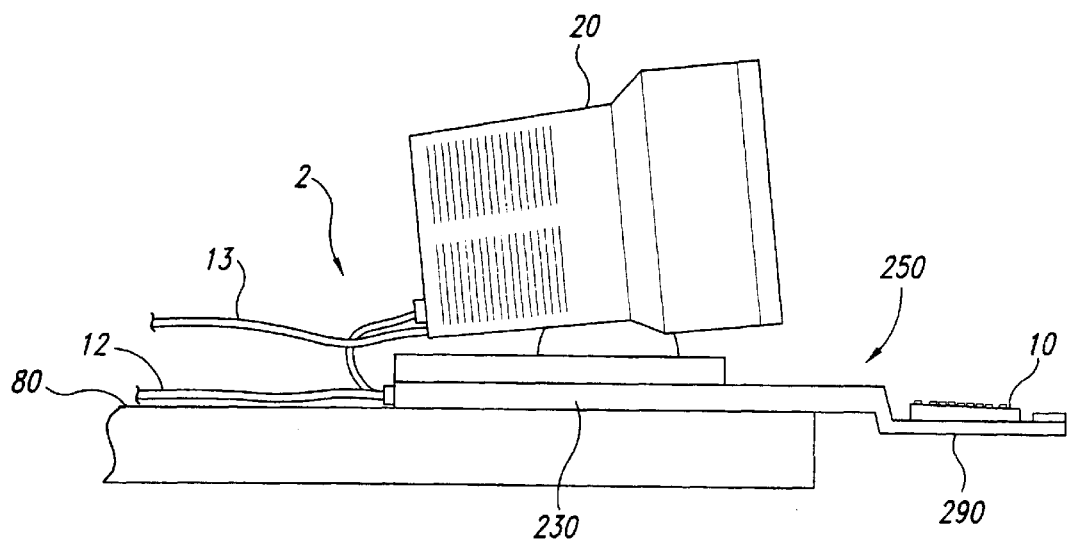
FIG. 11 is a side view of a device that operates in accordance with still another embodiment of the invention having a fixed support member.

FIG. 11 is a side view of a support device 2 that operates in accordance with still another embodiment of the invention. The support device 2 has a fixed support member 250 positioned to support the keyboard 10 while being held in place relative to the support surface 80 by the monitor 20. As shown in FIG. 11, the support member 250 may comprise a one-piece unit having a first portion 230 configured to fit beneath the monitor 20 and a second portion 290 positioned to support the keyboard 10. An advantage of the fixed support member 250 is that it may be inexpensive to manufacture. Conversely, an advantage of the support members 50 and 150 discussed above with reference to FIGS. 1–10 is that portions thereof are movable relative to the monitor 20 and may therefore be easier to position in accordance to the user's preference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method for supporting a first computer component in a selected position relative to a second computer component and a support surface, the method comprising:

engaging a first portion of a support assembly with the first computer component;

cantilevering the first portion of the support assembly outwardly away from a second portion by removably inserting the second portion of the support assembly between the second computer component and the support surface; and moving the first portion of the support assembly in three orthogonal directions relative to the second computer component to place the first computer component in the selected position.

2. The method of claim 1 wherein the act of engaging the second portion comprises clamping the second portion of the support assembly between the second computer component and the support surface.

3. The method of claim 1 wherein the act of engaging the second portion comprises:

placing the second portion of the support assembly on the support surface; and placing the second component on the second portion of the support assembly.

4. The method of claim 1 wherein the act of moving the first portion comprises translating the first portion relative to the second portion.

5. The method of claim 1 wherein the act of moving the first portion comprises pivoting the first portion relative to the second portion.

6. The method of claim 1 wherein the second computer component includes a computer monitor and cantilevering the first portion of the support assembly includes clamping the second portion of the support assembly between the computer monitor and the support surface.

7. The method of claim 1 wherein engaging the first portion of the support assembly with the computer component includes engaging the first portion with a computer keyboard.

* * * * *